Figure 1:
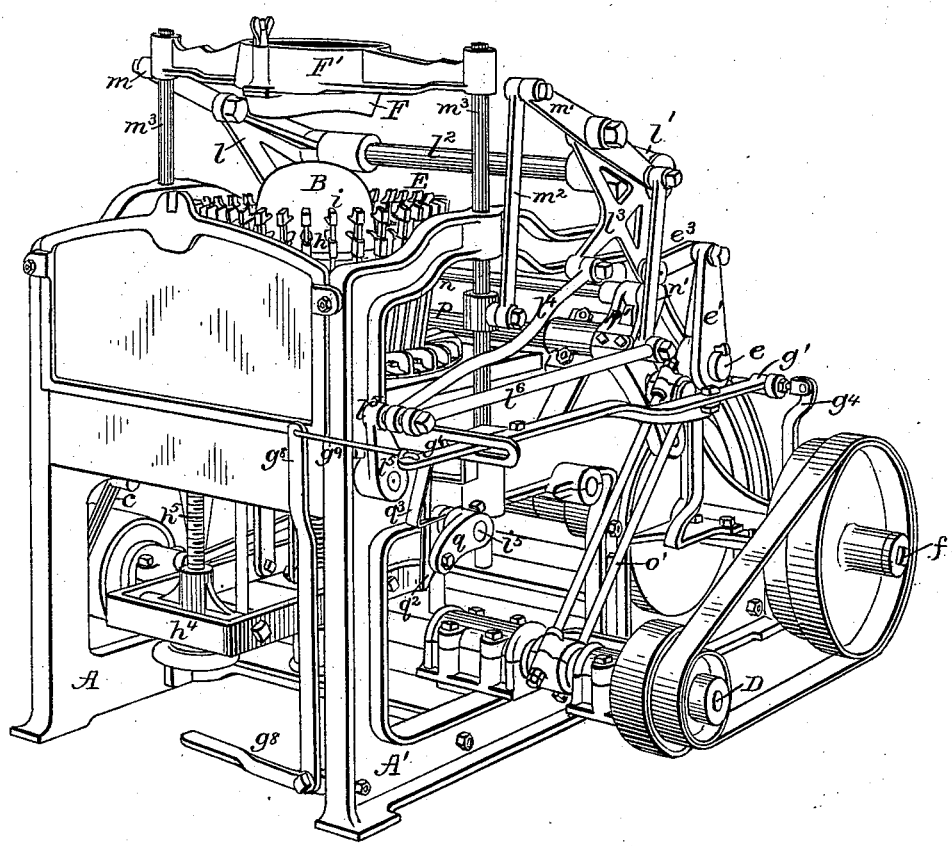

(No Model.) 7 Sheets—Sheet 1.

R. EICKEMEYER.

MACHINE FOR BLOCKING AND SHAPING HATS.

No. 361,353. Patented Apr. 19, 1887.

Attest:
Philip F. Larner.
Howell Bartle.

Inventor:
Rudolf Eickemeyer.
By Wm O Wood
Attorney.

(No Model.) 7 Sheets—Sheet 2.
R. EICKEMEYER.
MACHINE FOR BLOCKING AND SHAPING HATS.

No. 361,353. Patented Apr. 19, 1887.

Attest:
Philip F. Larner
Howell Bartle

Inventor:
Rudolf Eickemeyer
By Wm. C. Wood
Attorney.

(No Model.) 7 Sheets—Sheet 3.
R. EICKEMEYER.
MACHINE FOR BLOCKING AND SHAPING HATS.
No. 361,353. Patented Apr. 19, 1887.
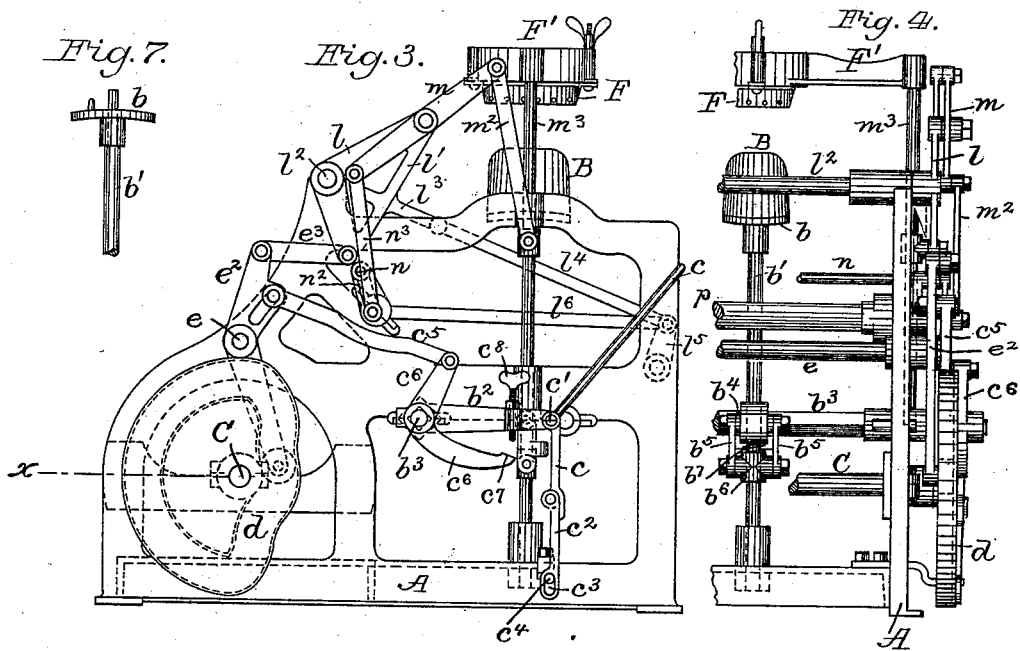
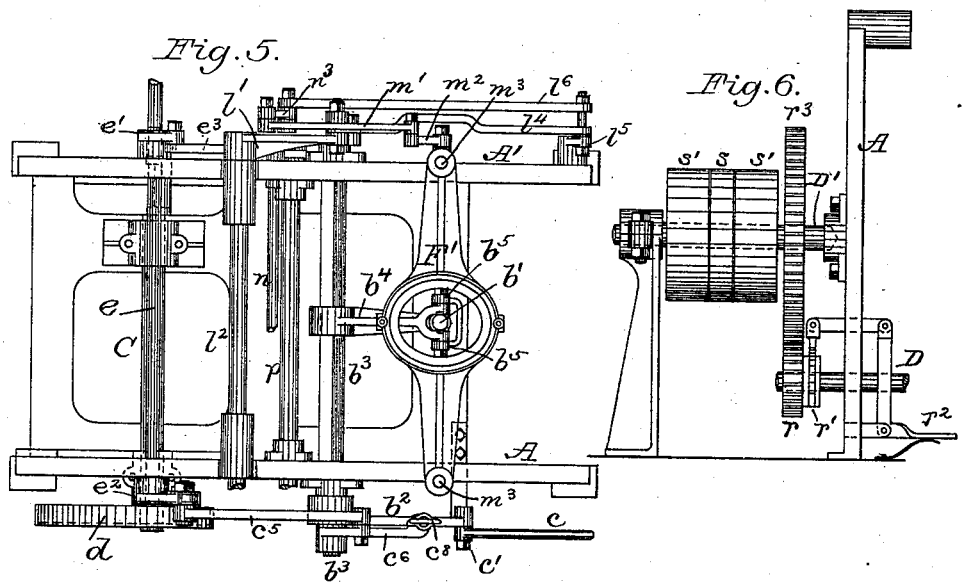
Attest:
Philip F. Larner.
Howell Battle.
Inventor:
Rudolf Eickemeyer.
By M. C. Morm
Attorney.

(No Model.) 7 Sheets—Sheet 4.
R. EICKEMEYER.
MACHINE FOR BLOCKING AND SHAPING HATS.
No. 361,353. Patented Apr. 19, 1887.
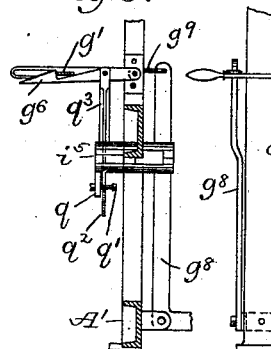
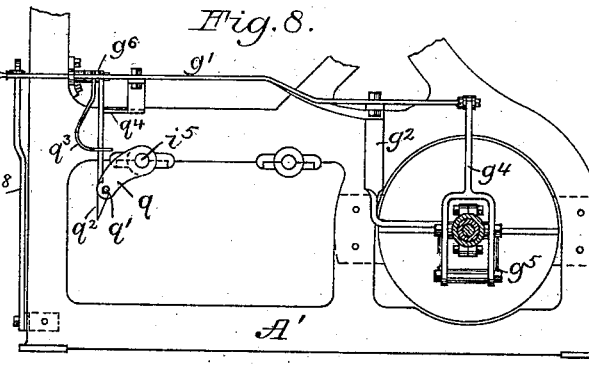
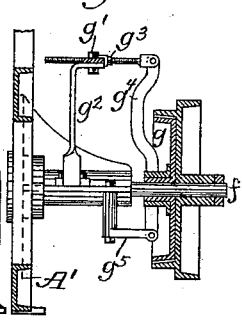
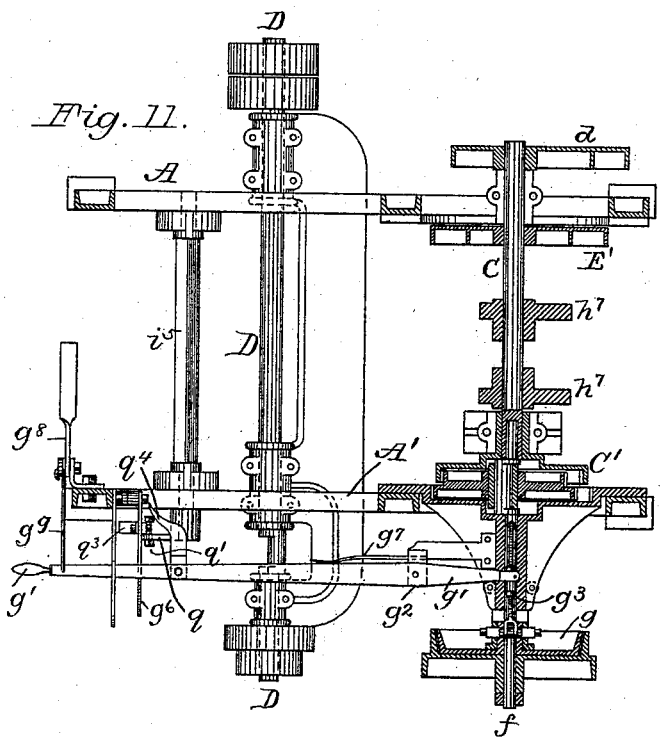
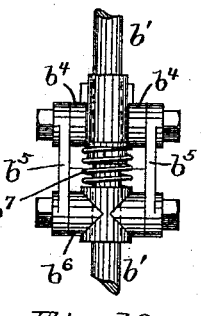

(No Model.)   7 Sheets—Sheet 5.
R. EICKEMEYER.
MACHINE FOR BLOCKING AND SHAPING HATS.
No. 361,353.   Patented Apr. 19, 1887.
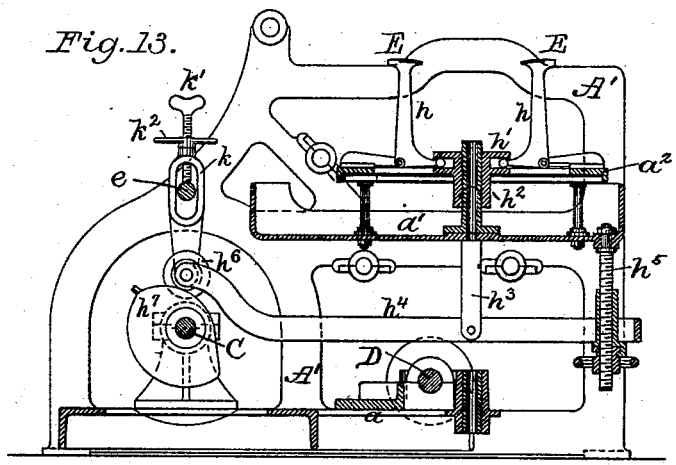
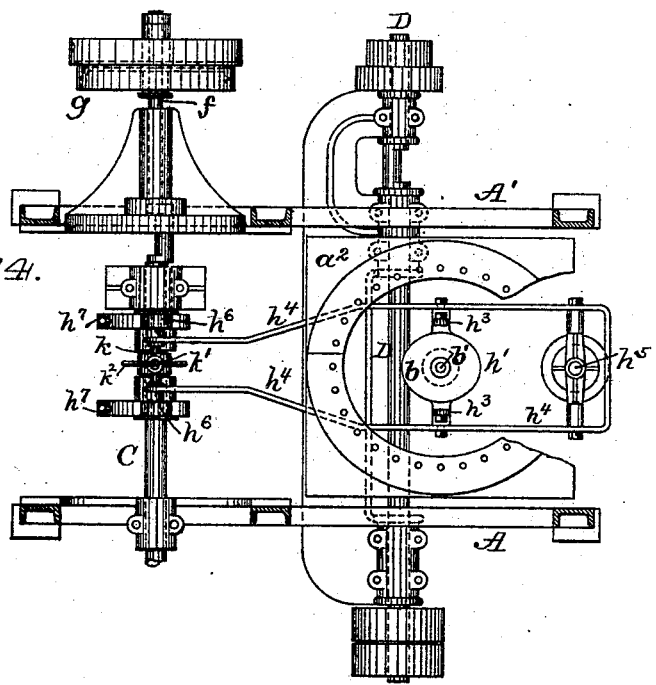

(No Model.)

7 Sheets—Sheet 6.

R. EICKEMEYER.
MACHINE FOR BLOCKING AND SHAPING HATS.

No. 361,353. Patented Apr. 19, 1887.

Attest:
Philip F. Larner.
Lowell Bartle.

Inventor:
Rudolf Eickemeyer,
By Wm. Chard
Attorney.

(No Model.) 7 Sheets—Sheet 7.
R. EICKEMEYER.
MACHINE FOR BLOCKING AND SHAPING HATS.
No. 361,353. Patented Apr. 19, 1887.
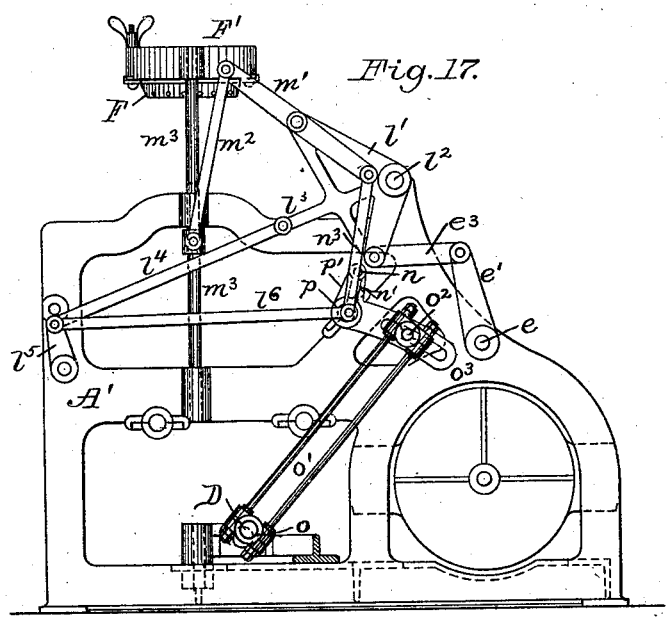
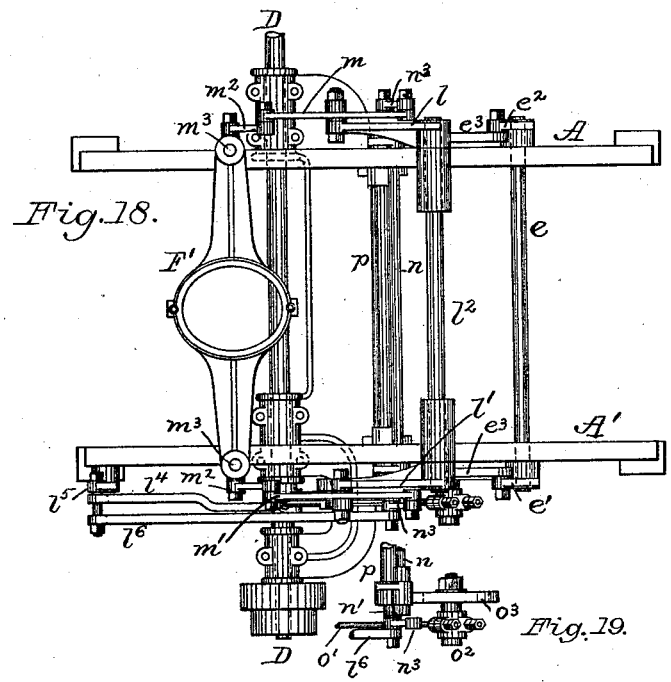
Attest:
Philip F. Larner.
Lowell Bartle
Inventor:
Rudolf Eickemeyer
By M.C. Ford
Attorney.
N. PETERS, Photo-Lithographer, Washington, D. C.

UNITED STATES PATENT OFFICE.

RUDOLF EICKEMEYER, OF YONKERS, NEW YORK.

MACHINE FOR BLOCKING AND SHAPING HATS.

SPECIFICATION forming part of Letters Patent No. 361,353, dated April 19, 1887.

Application filed November 20, 1886. Serial No. 219,495. (No model.)

*To all whom it may concern:*

Be it known that I, RUDOLF EICKEMEYER, of Yonkers, in the county of Westchester and State of New York, have invented certain new and useful Improvements in Machines for Blocking and Shaping Hats; and I do hereby declare that the following specification, taken in connection with the drawings furnished and forming a part of the same, is a clear, true, and complete description of the several features of my invention.

My said improvements are applicable to that class of machines known as "automatic blockers," which have heretofore been constructed and operated under certain Letters Patent heretofore issued to me. Some of said prior machines, however, have in fact been only partially automatic; but in Letters Patent No. 269,032, issued to me December 12, 1882, I disclosed the first machine known to me which was wholly automatic in its operation, and many of the features of invention then disclosed are now employed in my improved machines, and in connection therewith I also now employ certain other features of invention disclosed in Letters Patent No. 244,041, issued to me July 12, 1881, and for obtaining a fair understanding of the state of the art in this connection reference should be had to said two Letters Patent, as well as to certain other earlier Letters Patent therein designated by date and number.

So far as relates to the work directly performed on a hat or hat-body, the operation of machines embodying my present improvements does not differ from the operation of certain of my prior machines, and the same is true in detail of such active parts or elements as are actually engaged in contact with a hat during the blocking and shaping operation. With my said prior wholly-automatic blocking and shaping machine, (see Patent No. 269,032,) in the event of a hat-brim having been imperfectly clamped therein and not observed until after the machine had been started on its routine work, there was no provision made whereby the brim clamping could be corrected, and hence hats were sometimes ruined, it being obvious that a brim cannot be properly stretched, or the band of a hat properly developed, if the brim be so improperly clamped that its periphery cannot be controlled with uniformity. I have now so organized my machines and their driving-gear-ing that at the will of the operator a machine can be stopped at any stage of its routine work and at once backwardly operated and made to retrace steps already taken until the initial point has been reached, and then the machine can be stopped, thus enabling any error in the adjustment of a hat to be corrected without liability of injury to the hat or any undue loss of time on the part of the machine and its operator.

My improved machines are also so organized as to enable the continuous reciprocation of the banding-ring to any desired extent at any desired stage of the routine, and instead of being restricted, as in my said prior wholly-automatic machines, to a prescribed number of reciprocations progressively distributed downward along the crown of a hat between the first point of contact of the banding-ring with the side crown and the band of the hat.

After describing in detail a machine as illustrated in the drawings and embodying my present improvements as preferably organized by me, the features deemed novel will be specified in the several clauses of claim hereunto annexed.

Figure 2:
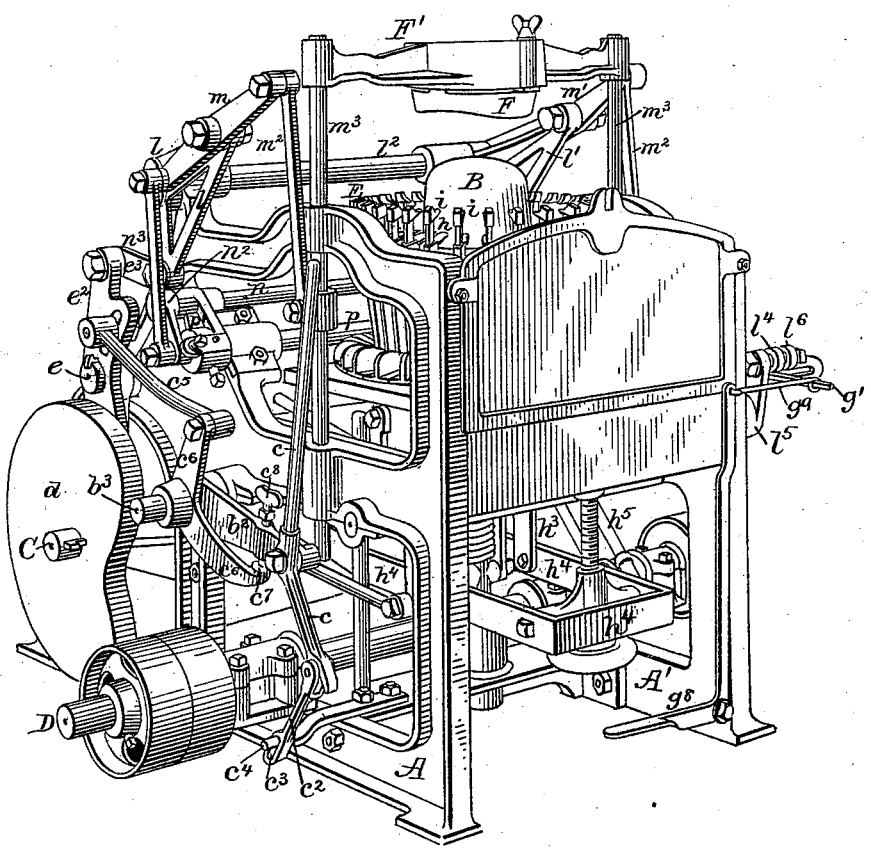
Figure 15:
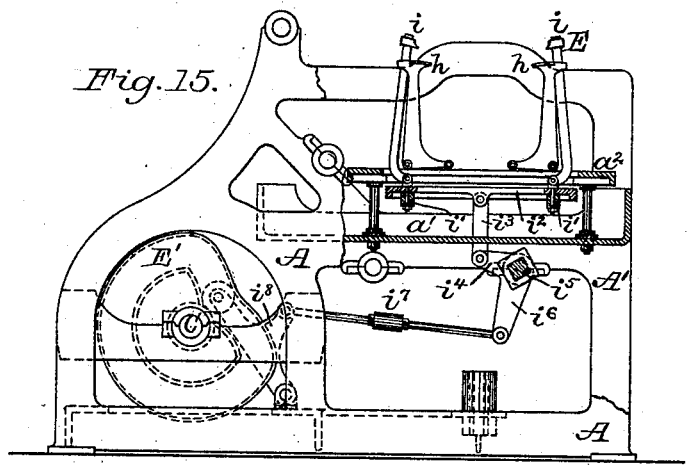
Figure 16:
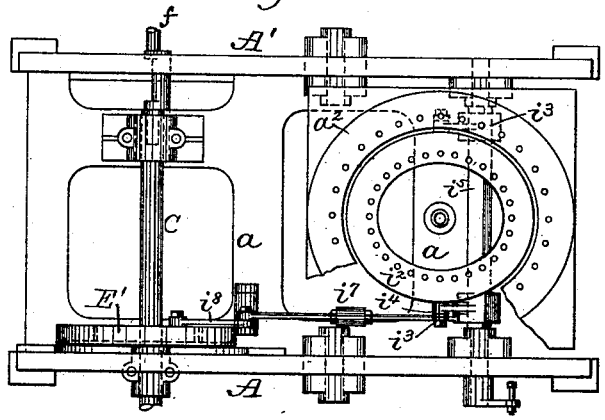

Referring to the seven sheets of drawings, Figures 1 and 2 are two front perspective views, showing the two sides of a machine embodying my invention. Fig. 3, Sheet 3, is a partial side elevation of the same. Fig. 4 is one-half of a rear elevation. Fig. 5 is a partial top or plan view. Fig. 6 is a partial front view of the machine, illustrating one form of its reversing-gear and means for wholly stopping the machine. Fig. 7 is a side view of the upper portion of the hat-block spindle. Fig. 8, Sheet 4, is a partial side elevation of the lower portion of the machine, its camshaft being shown in section. Figs. 9 and 10 are partial front elevations and sections of portions of the machine specially illustrative of the stop mechanism. Fig. 11 is a horizontal section of portions of the machine on line *x*, Fig. 3. Fig. 12 is a front view of a portion of the hat-block spindle and its lever and link-connections. Figs. 13 and 14, Sheet 5, are, respectively, partial vertical and partial horizontal sections of the machine, specially illustrating the mechanism by which the annular set of brim-clamping jaws or tongs are moved radially for stretching a hat-brim. Fig. 15, Sheet 6, is a partial side elevation and partial vertical section of said machine, specially illustrating the mechanism by which the clamping-jaws are made to close upon and to release the brim of a hat. Fig. 16 is a partial plan view, portions of the machine being broken away to better illustrate the parts shown in Fig. 15. Fig. 17, Sheet 7, is a partial side elevation of the machine, specially illustrative of the mechanism by which the banding-ring is vertically reciprocated and lifted and permitted to rest during the insertion and removal of hats. Fig. 18 is a partial plan specially illustrating the mechanism shown in Fig. 17. Fig. 19 is an enlarged plan of portions of the machine shown in Fig. 18, but detached therefrom.

The frame of the machine includes two side plates, A and A', several lateral plates, $a$, and the central fan-shaped plate, $a'$, there being above the latter a horizontal plate, $a^2$, mounted on standards, and having an oval opening therein, as clearly indicated in Figs. 13, 14, and 15.

Referring now to Fig. 3, and to such other figures as show the hat-block B, it is to be understood that although it is of the simple or wooden variety, other kinds may be employed without departure from my invention, and that expansible blocks, regardless of their specific construction and mode of operation, can be used, they requiring only the addition of the requisite mechanism for controlling their expansive and contractile movements—as, for instance, is fully shown in either of my said prior Letters Patent Nos. 244,041 or 269,032.

As clearly shown in Figs. 3, 4, and 7, the hat-block B is mounted upon a block-plate, $b$, provided with a dowel-pin and a central stud and carried on top of a sliding spindle or rod, $b'$, which can be lifted or lowered by means of the hand-lever $c$, which is fulcrumed at $c'$ on an arm, $b^2$, keyed upon a rock-shaft, $b^3$, which is in turn connected to the block-spindle by means of an arm, $b^4$, links $b^5$, and a cross-head, $b^6$, on said spindle. Between said cross-head and a fixed sleeve an expansive spiral spring, $b^7$, (shown in Fig. 12,) surrounds the spindle, and is heavily compressed when the block is fully elevated, thus providing against any lost motion at the several jointed connections and obviating all liability of objectionable vertical vibratory movement by the spindle during the banding operation. The hand-lever $c$, at its lower end, is pivoted by a knuckle-joint to a link, $c^2$, provided at its lower end with an elongated slot, $c^3$, occupied by a fixed stud, $c^4$, so that on swinging the lever in a vertical plane the hat-block can be lowered to its fullest extent, and also raised, if need be, but not fully, the slot $c^3$ in the link $c^2$ admitting of said farther upward movement, the hand-lever being used only for dropping the hat-block spindle preparatory to removing and inserting a hat and its block, the lifting movement being performed automatically. The automatic lifting-motion is derived from a cam, $d$, on the cam-shaft C, which oscillates a rock-shaft, $e$, carrying arms or levers $e'$ and $e^2$, the latter being coupled by means of a rod, $e^3$, to one arm of a bell-crank lever, $c^6$, loosely mounted on the rock-shaft $b^3$, the other arm of lever $c^6$ being provided with a bearing-face, $c^7$, which projects laterally beneath the arm $b^2$ and abuts against the lower end of a thumb-screw, $c^8$, tapped through said arm $b^2$, thus, by a portion of the vibration of the bell-crank lever causing the arm $b^2$ to be lifted, and correspondingly lifting the hat-block spindle. The rod $e^3$ is coupled to the lever $e^2$ by means of a slot, a screw-stud, and a nut, thus providing for a general adjustment as to the vibrations of the bell-crank lever $c^6$, while the thumb-screw $c^8$ provides for special adjustment of the relations between said bell-crank lever $c^6$ and the arm $b^2$, thus enabling adjustments for meeting all possible contingencies.

Power is communicated to the cam-shaft C, as shown in Fig. 11, from the main shaft D, the latter being provided with cone-pulleys belted to larger cone-pulleys loosely mounted on a short shaft, $f$, but coupled thereto by a friction-clutch, $g$. Said short shaft $f$, at its inner end, is coupled to the cam-shaft C by means of the differential gearing at C', substantially as shown in my prior Letters Patent Nos. 256,305 and 269,032; but other forms of gearing may be employed without departure from my present invention, although I prefer this form, because it is well suited for the purpose, and is much more compact and economical than an ordinary chain of gearing suitable for obtaining a corresponding reduction in speed, it being obviously desirable that the short shaft $f$ be rapidly rotated, in view of the necessity for using thereon a short driving-belt, and of the considerable amount of actual work performed by the cam-shaft. The friction-clutch $g$ is controlled by hand through the horizontal hand shipper or lever $g'$, pivoted on a bent bracket-arm at $g^2$, and coupled by an adjustable and cushioned or spring connection, $g^3$, to the vertical forked lever $g^4$, which at its foot is pivoted to a pendent bracket, $g^5$, all as clearly illustrated in Figs. 8 to 11, inclusive. Near the handle of the lever $g'$ there is a slotted guide, and also a horizontal spring-latch, $g^6$, which when the clutch is thrown into engagement confines the lever in position, said lever being thrown outward (whenever it is released) by means of the spring $g^7$ on the bracket-arm $g^2$. Said clutch may also be thrown into engagement by the foot of the operator applied to the treadle-lever $g^8$, which is coupled to the handle of the shipper $g'$ by a rod or link, $g^9$. Other forms of clutch may obviously be used without departure from my invention.

The release of the clutch-lever from its latch $g^6$ may be effected by hand on depressing the outer end of the latch; but it is also effected automatically by means which will hereinafter be described in another connection.

I will next refer to Figs. 13 to 16, and describe the set of brim-clamping jaws or tongs E, and the mechanism by which they are controlled for clamping and releasing the periphery of a hat-brim and radially expanded as in stretching the brim, and then contracted for receiving another brim. As in my prior machines, there is a series of annularly-arranged lower jaws, $h$, and with each of these there is an upper jaw, $i$. Each lower jaw, $h$, is in the form of a bell-crank lever pivoted upon the plate $a^2$, and their short arms occupy an annular slot in an annular cross-head, $h'$, which is provided with a hub or sleeve, $h^2$, coupled by two links, $h^3$, to the two sides of a double horizontal lever, $h^4$, adjustably fulcrumed by means of a cross-head or sleeve and wheel-nut on a pendent screw, $h^5$, and at its opposite end said lever is provided with friction-wheels $h^6$, for engagement with the cams $h^7$ on the cam-shaft C, all as fully shown in Figs. 13 and 14. It will now be seen that as the cams $h^7$ are slowly rotated the cross-head $h'$ will slowly rise and fall, thus causing the expansive and contractile movements of the tongs. The adjustable fulcrum at the pendent screw $h^5$ enables a convenient adjustment of the tongs for extensive variations; but I have also provided for adjusting the relations of the cams $h^7$ to the lever $h^4$, so as to nicely vary the extent of the expansive or brim-stretching movement. This is effected by means of a pendent link, $k$, which is coupled to the lever $h^4$ over the cams, and it straddles the rock-shaft $e$, so that the latter serves as a support for said link, and also for said lever when the latter is to be restricted in the range of its lifting movement. The upper end of the link is bored and tapped to receive the adjusting thumb-screw $k'$, (provided with a set-nut, $k^2$,) so that on turning the screw its lower end abuts upon the rock-shaft $e$, and the lever $h^4$ is thereby lifted away from its cams, and this causes the latter to vary in their lifting action, and also causes a corresponding variation in the expansive movement of the tongs. This combination of the annular set of tongs and their expanding and contracting mechanism differs from that disclosed in my aforesaid Letters Patent No. 269,032 only in that I have now for the first time provided for supporting the expanding-lever above its cams, and thus varying the action of said cam upon the set of tongs. In the machine disclosed in my prior Patent No. 244,041 the expansive movement of the tongs was effected by foot-power. The upper jaws, $i$, of these tongs have each a long vertical arm sliding in a loop at the rear of each lower jaw, so that the upper jaws may freely rise and fall, regardless of whether the set of lower jaws is in a contracted or an expanded position. These upper jaws are actuated by mechanism clearly shown in Figs. 15 and 16. All of the upper jaws at the lower ends of their arms are pivoted on bolts $i'$, which pass through an annular plate, $i^2$, and each bolt is provided with a heavy expansive rubber spring, thus enabling each jaw to do its proper clamping duty, regardless of any slight variations in the mechanism or variations in the thickness of hat-brims. Said plate $i^2$ is coupled by links $i^3$ to arms $i^4$ on a squared rock-shaft, $i^5$, having a rigid pendent arm, $i^6$, which is coupled by an adjustable rod, $i^7$, to one arm of a bell-crank lever, $i^8$, pivoted at its foot upon a bottom plate of the frame, and having on its other arm a friction-wheel, which occupies a cam-groove in the cam E' on the cam-shaft, so that during each revolution of the latter and of the cams E' and $h^7$ the jaws are closed while in their most contracted position, and then, while tightly clamped, they simultaneously move outwardly to their most expanded position. The upper jaws and their operating mechanism are all substantially as disclosed in my Letters Patent No. 269,032, December 12, 1882.

I will next refer to Figs. 17, 18, and 19, and describe the banding-ring F and the mechanism by which it is operated. It is to be understood that said ring has a long downward and upward movement for starting from an elevated resting-point and moving down to a point at which it can commence to engage with a hat on a block carried by the partially-elevated block-spindle, and then, after the banding operation, it moves promptly upward to admit of the convenient removal of a hat and its block and the insertion of another, and I term these movements of the banding-ring its "extensive" or "general vertical" movements, as distinguished from its "rapidly-reciprocating" or "pumping" movement next described. After the banding-ring commences to engage with a hat-crown, it continues to move downward; but meantime it is also rapidly reciprocated vertically, and this reciprocation continues until the band is again lifted to the point at which said reciprocation commenced. I will first describe the mechanism which causes the extensive or general movements of the banding-ring, and then describe the mechanism which induces the pumping movement. I have already referred to the cam $d$ on the cam-shaft, which causes the rock-shaft $e$ to oscillate, and also to the arms $e'$ and $e^2$ on said rock-shaft, and now I will state that both of said arms are coupled by links $e^3$ to the lower ends of the two bell-crank levers $l$ and $l'$, pivoted on a rock-shaft, $l^2$, and on the upper ends of said levers two straight levers, $m$ and $m'$, are pivoted, but so held and controlled as to serve at times as mere longitudinal extensions of the upper arms of said levers $l$ and $l'$, and these straight levers at their outer ends are coupled by links $m^2$ to vertically-sliding rods $m^3$, on the tops of which the annular cross-head F' is mounted, and to the under side of this cross-head a banding-ring, F, (these being of various sizes and forms,) can be readily applied and removed. Assuming the straight levers $m$ and $m'$ to be held rigidly, it will be obvious that the rotation of the side grooved cam, $d$, formed substantially as indicated in Fig. 3, will impart to the banding-ring the general upward and downward movements described. The rigid holding of the said straight levers $m$ $m'$ is, however, in this machine dependent upon the operation of parts which also co-operate in causing the rapid reciprocation of the banding-ring, and these are well shown in Figs. 17 and 18. The bell-crank lever $l'$ differs from lever $l$ in that it has thereon, midway between its two main arms, a third arm, $l^3$, and this is coupled by a link, $l^4$, to the end of an arm, $l^5$, pivoted on the side of the frame of the machine. This arm $l^5$ is also coupled by a link, $l^6$, to a vibrating rock-shaft, $n$, by means of a stud or pin on a pendent arm, $n'$, and at the opposite end of said rock-shaft there is another arm, $n^2$. These two arms $n'$ and $n^2$ are coupled by links $n^3$ $n^3$, respectively, to the rear ends of the two straight levers $m$ and $m'$, thus firmly holding said straight levers when they serve as mere extensions of the upper arms of the bell-crank levers $l$ and $l'$—as, for instance, whenever the arms $n'$ and $n^2$ on said rock-shaft $n$ are not engaged in imparting the rapidly-reciprocating or pumping movement to the banding-ring. This pumping movement is derived from the main shaft D, which has thereon a short crank, at $o$, coupled by means of a complex or double-rod pitman, $o'$, and an adjustable crank-pin, $o^2$, to a semipendent slotted arm, $o^3$, on still another rock-shaft, $p$, and this latter has at its two ends arms $p'$, affording bearings, in which the vibrating rock-shaft $n$ is mounted, so that as the main shaft is rapidly rotated the rock-shaft $n$ is rapidly reciprocated or vibrated in the arc of a circle of which the rock-shaft $p$ is the center. The arms on the rock-shaft $p$ are of the same length as those on the rock-shaft $n$, and hence when the crank pins or studs of the arms $n'$ and $n^2$ are coincident with the axis of the rock-shaft $p$ said pins are stationary; but when said pins are moved out of said coincidence, as by the movement of the bell-crank lever $l'$ and the links $l^4$ and $l^6$, and also the links $n^3$, the straight levers $m$ and $m'$ are caused to rapidly reciprocate on their pivots, and thus cause the banding-ring to be rapidly reciprocated.

In the machine disclosed in my Letters Patent No. 269,032 the pumping movement of the banding-ring was in the arc of a circle, and its motion was derived from a wave-line cam on the cam-shaft, and in the machine disclosed in my Patent No. 244,041 said movement was derived from the driving-shaft; but it was controlled by hand, instead of automatically, as in my present machines. The novel feature now devised by me in this connection consists in providing the bell-crank lever $l'$ with its third arm, $l^3$, and coupling said arm to the rock-shaft $n$ by means of the links $l^4$ and $l^6$ and the arm $l^5$, thus enabling the banding-ring cross-head to be mounted on vertically-sliding rods and to have its pumping movements automatically controlled.

I have already stated that the friction-clutch shipper is also operated automatically, and this occurs after each banding operation, leaving the main shaft still in rapid motion. As shown in Figs. 8 to 11, inclusive, one end of the rock-shaft $i^5$, below the shipper-lever $g'$, and at one side thereof, has an arm, $q$, provided with a pin, $q'$, projecting laterally at its outer end toward the frame of the machine. Above this arm, on the latch $g^6$, before described, is a pendent catch, $q^2$, which has a notch or shoulder with which said pin $q'$ will engage whenever the lower end of said catch $q^2$ is not moved rearward in its guide $q^3$ by a lateral finger, $q^4$, on the shipper-lever $g'$. When the shipper-lever $g'$ is engaged by its latch $g^6$, said finger $q^4$ permits the pendent catch $q^2$ to so hang that its shoulder will be engaged by the pin $q'$ on the arm $q$; but when the clutch-lever has been released by hand or otherwise the finger $q^4$, moving in the arc of a circle, forces the pendent catch out of the path of the pin $q'$.

The functions of the several parts and their separate modes of operation having thus been fully described in detail, the operation of the machine as a whole will require but little description.

The machine being at rest and the banding-ring elevated, as shown in Fig. 3, and the hat-block plate and spindle lowered, a hat softened by steam and water and with a block therein is placed upon the block-plate, the central spindle on the plate occupying a central hole in the block, and the one dowel-pin also occupying its hole in said block, so that the adjustment of the hat is assured, not only centrally but longitudially, and also causing the front of an egg-oval hat-crown to occupy its proper position. The set of tongs having been already properly adjusted peripherally to the size of brim, the latter is inserted, the upper jaws being then always elevated. After smoothing the brim so that its periphery can be wholly seized by the tongs the hand-shipper $g'$ is swung inwardly for throwing the clutch $g$ into position to rotate the cam-shaft. When the hat is inserted, the set of tongs stand fully expanded, but they promptly contract, the upper jaws being elevated until they reach their contracted position, whereupon they close tightly, and slowly begin their expansive movements. In the meantime the banding-ring is automatically lowered until it reaches the side crown of the hat, whereupon its reciprocation begins and continues for sometime after the banding-ring has reached its lowest position, the tongs also continuing to slightly expand, thus thoroughly developing the band of the hat; so, also, in the meantime, is the hat-block slowly raised until it reaches its full height. About one hundred and twenty reciprocations or pumping motions can generally be relied upon; but if at any time more be needed the shipper $g'$ can be freed, thus stopping the cam-shaft and delaying the next routine step as long as need be, while continuing the banding operation. As soon as said operation is completed the banding-ring rises to its full height and stands at rest, and the tongs, with their upper jaws fully elevated, are fully expanded. The block being then lowered by means of its hand-lever $c$ leaves the hat and its block free to be removed and another inserted. Although such a machine, with the cone-pulleys shown, can be operated at two speeds, the lowest speed can be relied upon for properly working hats at the rate of one per minute, including the insertion and removal of the hats, other conditions being favorable as to heating, and having the hats in conveniently available positions.

I have hereinbefore referred to the fact that I have now for the first time organized machines of this class, so that they can be operated backwardly as well as forwardly. In other words, I have not only for the first time provided the machine with reversing-gear, but have also so formed and arranged the several cams and their contacts that the machine can be freely run backwardly without liability of injury to any of the parts, and thus enable the operator after he has started a machine on its routine duty to return to the starting-point and there stop, giving him ample opportunity to correct any imperfect clamping of a brim or other adjustment of a hat on its block before it can possibly be injured, as would be the case should the machine be permitted to arbitrarily continue its routine—as, for instance, with the machine and gearing disclosed in my Letters Patent No. 269,032. In the machine disclosed in my Letters Patent No. 244,041 the banding-ring was wholly under the control of the operator, because its general vertical movements were effected by means of a hand-lever and counter-weight, and hence in that machine a capacity for backward operation was of no consequence, and as a rule said capacity can only be of value in a machine which is fully automatic.

In Fig. 6 the main shaft D, instead of having belt-pulleys for driving it, as shown in Fig. 11, has a loose gear, $r$, and a splined clutch, $r'$, controlled by a foot-treadle, $r^2$, and a spring. Above said main shaft there is a counter-shaft, D', mounted in bearings afforded by a standard and one of the side plates, A, as shown, and carrying a gear, $r^3$, which meshes with the gear $r$ on the shaft D. On this counter-shaft there is a central loose pulley, $s$, and two tight pulleys, $s'$, so that when two belts are applied thereto, one crossed and the other straight, either belt, by means of an ordinary shipper, may be made to occupy the loose pulley and the other to occupy its appropriate tight pulley. When the main shaft D is provided with tight and loose belt-pulleys, as shown in Fig. 11, a single driving-belt descends from an overhead counter-shaft having a loose pulley and two tight pulleys, as on the counter-shaft D', and power is applied thereto from another shaft by way of a crossed and a straight belt controlled by an ordinary shipper, as is usual in belt-gearing for operating lathes.

The machine being adapted to operate both forwardly and backwardly, as already described, it will be seen that the mere shifting of the belts will promptly cause a reversal of operation and enable the attendant to correct any errors he may have made in the adjustment of a hat, and by operating the treadle $r^2$ the machine can be promptly stopped at any portion of its routine movements; or by operating the treadle $g^8$, Fig. 11, the cam-shaft and the parts deriving movement therefrom can be stopped while permitting the remainder of the machine to continue in motion.

Having thus described my invention, I claim as new and desire to secure by Letters Patent—

1. The combination, substantially as hereinbefore described, of the brim clamping and stretching tongs, the banding-ring and its cross-head mounted on vertically-sliding rods, mechanism, substantially as described, for automatically imparting to said ring extensive or general vertical movements, and mechanism, substantially as described, for imparting to said ring rapidly-reciprocating movements independently of said general vertical movements.

2. In an automatic machine for blocking and shaping hats, the combination, substantially as hereinbefore described, of a hat-block spindle, a set of brim clamping and stretching tongs, a reciprocating banding-ring, mechanism, substantially as described, for automatically operating said spindle, tongs, and ring in their regular and proper order and organized to operate the same both forwardly and backwardly, and gearing for driving said mechanism in both directions, whereby errors in adjusting a hat in said machine may be corrected at any stage of the routine operation, and any portion of said operation fully or partially repeated.

3. In a machine for blocking and shaping hats, the combination, substantially as hereinbefore described, of a hat-block, a banding-ring, an annular set of brim clamping and stretching tongs, a lever coupled to said tongs for radially expanding and contracting them, an adjustable bearing at one end of said lever, a cam at the opposite end for vibrating said lever, and an adjustable link supporting said lever above said cam for varying the extent of contact between the cam and lever and correspondingly varying the expansive or stretching movement of said tongs, and adapting the latter to properly engage with and to stretch hat-brims of various peripheral dimensions.

4. The combination, substantially as described, of the slowly-vibrated bell-crank levers $ll'$, the levers $mm'$, mounted thereon, the banding-ring, cross-head, and its sliding rods coupled to said levers $m m'$, the rapidly-operated rock-shaft $p$, the vibrating shaft $n$, carried on said rock-shaft and having arms coupled to said levers $m m'$, and also coupled to a pivoted arm, $l^5$, which is in turn coupled by the link $l^4$ to an arm, $l^3$, on one of said bell-crank levers.

RUDOLF EICKEMEYER.

Witnesses:
JAMES S. FITCH,
R. EICKEMEYER, Jr.